(12) United States Patent
Berthie

(10) Patent No.: US 8,177,508 B2
(45) Date of Patent: May 15, 2012

(54) HELICOPTER PROVIDED WITH A PLURALITY OF LIFT ELEMENTS FOR CONTROLLING THE ANGLES OF INCIDENCE OF ITS BLADES

(75) Inventor: Pierre Berthie, Cabries (FR)

(73) Assignee: Eurocopter, Marignane Cedex (FR)

( * ) Notice: Subject to any disclaimer, the term of this patent is extended or adjusted under 35 U.S.C. 154(b) by 581 days.

(21) Appl. No.: 12/392,426

(22) Filed: Feb. 25, 2009

(65) Prior Publication Data

US 2009/0214340 A1 Aug. 27, 2009

(30) Foreign Application Priority Data

Feb. 27, 2008 (FR) ...................................... 08 01079

(51) Int. Cl.
*B63H 3/00* (2006.01)
(52) U.S. Cl. ........................................................ 416/104
(58) Field of Classification Search .................. 416/104, 416/111
See application file for complete search history.

(56) References Cited

U.S. PATENT DOCUMENTS

| 2,481,750 A | | 9/1949 | Hiller |
| 2,534,353 A | * | 12/1950 | Hiller, Jr. et al. ................ 416/18 |
| 2,818,123 A | | 12/1957 | Hiller |

FOREIGN PATENT DOCUMENTS

| DE | 2409227 | 9/1975 |
| GB | 735571 | 8/1955 |

OTHER PUBLICATIONS

French Priority Search Report dated Oct. 15, 2008, in priority application.

* cited by examiner

*Primary Examiner* — Jenny L Wagner
(74) *Attorney, Agent, or Firm* — Brooks Kushman P.C.

(57) ABSTRACT

A helicopter is fitted with a main rotor (1) having at least two blades (10, 20), each blade (10, 20) being provided with attachment elements (11, 21) for attaching it to a hub (2) of the rotor (1). The rotor is also fitted with one lift element (12, 22) per blade (10, 20), each lift element (12, 22) being mechanically linked to a single blade (10, 20) to vary the pitch of the single blade (10, 20) with which the lift element (12, 22) is linked.

21 Claims, 4 Drawing Sheets

HELICOPTER PROVIDED WITH A PLURALITY OF LIFT ELEMENTS FOR CONTROLLING THE ANGLES OF INCIDENCE OF ITS BLADES

FIELD OF THE INVENTION

The present invention relates to a helicopter fitted with a plurality of lift elements for controlling the aerodynamic angles of incidence of the helicopter's blades. Consequently, the invention lies in the narrow technical field of pitch controls for helicopter blades.

BACKGROUND OF THE INVENTION

A helicopter commonly has a main lift and propulsion rotor that is provided with a plurality of blades.

The blades of the main rotor describe a very flat cone, referred to as the "rotor cone" by the person skilled in the art, with the plane of rotation thereof being perpendicular to the general lift generated by the main rotor. This general lift of the main rotor may then be resolved into a vertical lift force and a horizontal force that drives the helicopter in translation.

Consequently, the main rotor provides a helicopter both with lift and with propulsion.

Furthermore, by controlling the shape and the angle of inclination of the rotor cone relative to the frame of reference of the helicopter, a pilot can control the helicopter with precision.

In order to act on the rotor cone, the blades are caused to flap so as to modify their angles of incidence relative to the drive plane of the rotor, said drive plane being perpendicular to the mast of the rotor.

As a result, the helicopter is provided with specific means serving to vary the pitch of each blade, and consequently to vary the aerodynamic angle of incidence of each blade relative to the incident stream of air through which the blade is passing.

By causing the pitch of a blade to vary, the lift it generates is modified, thereby causing the blade to flap.

In order to control the general lift of the rotor, both in magnitude and in direction, the helicopter pilot thus acts generally on the value of the pitch angle of each blade by causing the blade to turn about its longitudinal pitch axis.

Thus, when the pilot causes the pitch of the blades to vary collectively, i.e. causes identical variation in the pitch of all of the blades, that causes the magnitude of the general lift of the main rotor to be varied so as to control the altitude and the speed of the helicopter.

In contrast, collective pitch variation has no effect on the direction of said general lift.

In order to modify the direction of the general lift generated by the rotor, it is appropriate to cause the rotor cone to be inclined by causing pitch to vary cyclically as opposed to collectively. Under such circumstances, the pitch of a blade varies as a function of its azimuth direction, and during one complete revolution it passes from a maximum value to a minimum value, which values are obtained in diametrically opposite azimuth directions.

Causing the pitch of the blade to vary cyclically gives rise to cyclical variation in the lift of the blade and thus varies the angle of inclination of the rotor cone. By controlling cyclic pitch variation of the blades, the pilot controls the attitude of the aircraft and its movement in translation.

U.S. Pat. No. 2,534,353 discloses a first device for controlling the pitch of the blades of a helicopter.

According to that document, a helicopter rotor is fitted with two blades each secured to a sleeve that is attached to a hub.

The pilot controls the collective pitch of the blades by means of a lever acting on a rod housed inside the rotor mast. The rod delivers its movement to first and second rods attached to the hub. By moving the collective pitch control lever, the pilot causes said rod to move in translation, thereby causing the hub, and consequently the blades, to turn about a pitch variation axis.

The hub is also secured to first and second lift elements arranged in the plane of the blades via first and second connection shafts rigidly connected together, the longitudinal axis of the lift elements being perpendicular to the longitudinal axes of the blades. These lift elements are referred to as "paddles" by the person skilled in the art.

Each connection shaft is also connected to a control plate known as a swashplate via scissors linkage. More precisely, the swashplate comprising a rotary plate and a non-rotary plate, the scissors linkage are secured to the rotary plate of the swashplate.

In addition, the non-rotary plate has a stick that the pilot can grasp.

In order to control the cyclic pitch of the blades, the pilot moves the stick to incline the non-rotary plate, and consequently to incline the rotary plate. The inclination of the rotary plate is then transferred to the first and second connection shafts via the scissors linkage, thereby enabling the pitch of the lift elements to be modified.

The lift generated by the lift elements thus varies, thereby causing them to flap and consequently causing the hub to tilt.

As a result of the hub tilting, the two blades have their own pitch modified.

That first device is relatively simple but it requires the presence of a swashplate that is penalizing both aerodynamically and in terms of weight.

Furthermore, it requires the presence of two subassemblies, respectively for controlling collective pitch variation and for controlling cyclic pitch variation of the blades, thereby leading to large weight and increasing the risk of breakdown.

Finally, the lift elements are supposed to cause the pitch of the blades to vary cyclically. Nevertheless, that does not really happen, strictly speaking, insofar as both lift elements act together on the hub and thus on both blades simultaneously and in identical manner.

Furthermore, it is found that the forces that the pilot needs to deliver in order to incline the lift elements, when acting on the stick of the non-rotary plate, can sometimes be extremely large.

To remedy this particular drawback, a second device is known from U.S. Pat. No. 2,818,123.

According to that document, each lift element is fitted with a tab. The scissors linkages arranged on the rotary plate do not entrain pitch variation of the lift elements, but may cause the tabs to be inclined relative to said lift elements.

By varying the inclination of a tab, the lift of the assembly comprising the lift element and the tab is modified, and consequently the pitch of the blades is modified.

The force the pilot needs to exert in order to vary the pitch of the blades is thus less than in the first device insofar as the lift surface area of the tab is small compared with the lift surface area of the lift elements.

Nevertheless, the above-mentioned drawbacks remain. Furthermore, those first and second devices are, a priori, not applicable to a helicopter having more than two blades insofar as the hub can only turn about a single axis during cyclic pitch variation.

Document DE 2 409 227 discloses another device provided with two lift elements secured to the ends of a single beam passing through the head of the rotor.

Moreover, the state of the art includes a third device used on the modern helicopter.

The collective and cyclic pitch controls of the pilot are connected to three servo-controls via rods and mixers or indeed electrical controls that are secured to the non-rotary plate of a swashplate.

The swashplate is also mechanically linked to each blade by a pitch control rod.

When the pilot seeks to modify the collective pitch of the blades, action is taken on a control that causes the three servo-controls to raise or lower the swashplate assembly, i.e. both the non-rotary plate and the rotary plate.

The pitch control rods are then all moved through the same distance, which implies that the pitch of all the blades varies through the same angle.

In contrast, in order to vary the cyclic pitch of the blades so as to steer the helicopter in a given direction, the pilot causes only one of the servo-controls to move, for example.

The swashplate does not move vertically but instead tilts relative to the mast of the rotor. Each pitch control rod then moves in a direction and through a distance that are specific thereto and the same applies to the pitch of the associated blade.

Pitch control is to some extent individualized, unlike the first and second devices, since each blade is controlled by its own pitch control rod.

That third device is very effective, which explains why it has become widespread. Nevertheless, the forces that need to be applied to control the blades are large, particularly on heavy helicopters, so the servo-controls and the swashplate present weights and dimensions that are large, which is penalizing.

Furthermore, their presence tends to create aerodynamic disturbances.

OBJECT AND SUMMARY OF THE INVENTION

An object of the present invention is thus to propose a helicopter that makes it possible to overcome the above-mentioned limitations.

Thus, the invention seeks to obtain a device and a method for changing the pitch of the blades of the main rotor of a helicopter that are simultaneously light in weight and effective in providing full control over the collective and cyclic pitch of the blades, regardless of the number of rotor blades.

According to the invention, a helicopter is fitted with a main rotor having at least two blades, each blade being provided with attachment means to a hub of the rotor. It should be observed that the attachment means for attaching a blade to the hub may be constituted by a sleeve that is secured by the usual means, or possibly by a sleeve forming an integral portion of the blade, for example.

The helicopter is remarkable in that it is provided with one lift element per blade, each lift element being mechanically linked to a single blade to vary the pitch of said single blade to which the lift element is connected.

The pitch of each blade is thus controlled by a lift element that is linked to the attachment of the blade. Unlike the first and second devices of the prior art, each blade is thus indeed controlled by its own lift element.

Each lift element is then managed independently, both functionally and mechanically so as to vary the pitch of a single blade individually.

Furthermore, the system is workable regardless of the number of blades insofar as the lift elements need not necessarily be at an angle of 90° relative to the blades, and need not lie in the same plane as the blades. The invention is applicable to a helicopter having at least two blades but not necessarily only two blades, and that constitutes a distinct advantage.

Compared with the third prior art device, it is easier to move a lift element of small dimensions rather than a relatively large blade. In addition, the aerodynamic effect generated by the lift element enables the forces that need to be exerted to be limited.

Furthermore, the invention may include one or more of the following additional characteristics.

Since each lift element is mechanically linked to one blade, each lift element is advantageously constrained in rotation with the blade with which it is mechanically linked to pivot about a first longitudinal axis for varying the pitch of the blade.

By causing a lift element to flap, said lift element moves in pivoting, and thereby pivots the blade about the corresponding first longitudinal axis.

The lift element thus controls the pitch of the blade directly, and not via the hub of the rotor, for example.

To vary collective pitch, action is taken on all of the lift elements so that the lift elements flap in identical manner, whereas to vary cyclic pitch, action is individualized.

Consequently, it is advantageous for each lift element to be mechanically linked to a single blade via a mechanical connection that is independent of the rotor hub, the mechanical connection advantageously linking the lift elements to a zone where the blade is attached to the hub, i.e. either to the blade attachment means or else to a segment of the blade itself.

Thus, the mechanical connection does not include the rotor hub, unlike the first and second prior art devices in which each lift element is mechanically linked to the hub and causes the hub to tilt.

More precisely, since each lift element is mechanically linked to a single blade via a mechanical connection, the mechanical connection optionally includes a bent bar having a first end secured to the attachment zone of the blade, more precisely to the attachment means for attaching the blade to the hub or to a segment of the blade itself.

In first and second variants of the arrangement of the lift elements, each lift element is constrained in pivot about the flapping axis of said lift element with a second end of the corresponding bent bar via a hinge that enables the lift element to pivot about a second longitudinal axis for varying the pitch of the lift element.

In a third variant of the arrangement of the lift element, a second end of each bent bar is attached via an intermediate link to the corresponding lift element, more precisely to the hinge enabling the lift element to perform a pivoting movement about a second longitudinal axis for varying the pitch of the lift element.

In the first and second variants, it is then possible for the hinge of the lift element to be attached to the second end of the associated bent bar. Similarly, in the third variant, the hinge of the lift element is attached to the intermediate link.

Nevertheless, regardless of the variant of the invention, it is advantageous to support each lift element. The hinge of each lift element is then provided with support means and an attachment having three degrees of freedom, the support means being secured to the corresponding lift element and the attachment having three degrees of freedom being attached to a rotary unit comprising the mast of the rotor and its hub, and also to the attachment means connecting the blade to the rotor hub.

The support means thus passes through the second end of the bent bar in such a manner as to enable the lift element to perform a pivoting movement about the corresponding second longitudinal axis for varying pitch and thus entrain pivoting of the bent bar about its flapping axis.

Furthermore, it should be observed that the attachment having three degrees of freedom, e.g. a spherical stop, is dimensioned to minimize the distance between the flapping axis of the lift element and the first longitudinal axis for varying the pitch of the corresponding blade so that said flapping axis and said first longitudinal axis substantially coincide.

In the first variant and possibly also in the second variant, the attachment having three degrees of freedom is therefore attached to the rotor hub, whereas in the third variant it is attached to the rotor mast, or to a member extending said mast.

Independently of the arrangement of the lift elements, in the method implemented by the invention and described above, the pilot of the helicopter begins by modifying the pitch of the lift elements in order to modify the lift generated by said lift elements. This modification causes the lift element to flap in that it moves up or down as appropriate, thereby mechanically rotary the blade to which it is linked about the first longitudinal axis corresponding to the blade.

It will be understood that the forces that need to be applied to turn a lift element of small size about the corresponding second longitudinal axis are considerably smaller than the forces needed to turn a blade about the corresponding first longitudinal axis for varying its pitch, e.g. when applying the techniques implemented by the third prior art device.

Consequently, it becomes possible to simplify the blade pitch changing system. In spite of the extra weight due to the lift elements and their mechanical connection, the invention remains surprisingly advantageous compared with the third known device.

When they are not flapping, the blades are contained in a first plane, and when they are not flapping, the lift elements that are mechanically linked to said blades are contained in a second plane. In a first variant of the arrangement of the lift elements, the first and second planes coincide. The first and second pitch variation axes thus lie in a single plane.

In contrast, in second and third variant arrangements of the lift elements, the first and second planes are mutually parallel, with one plane lying above the other.

The first variant is advantageous because of its simplicity. Nevertheless, the second and third variants are optimized as a function of need.

The second variant consists in offsetting the first and second planes a little, by an order of magnitude matching the thickness of the lift elements, with the bent bars linking the lift elements to the attachment zone of the corresponding blades being inclined so as to eliminate the effects of gravity on the lift elements.

Indeed, the weight of the lift elements tends to cause them to flap downwards. This flapping causes the blades to pivot in a manner not required by the pilot.

But, surprisingly, when the second plane is situated a little below the first plane, it is found that the centrifugal forces exerted on the lift elements when the rotor is revolving straightens out the lift elements in such a manner as to counter the harmful influence of their weight.

The third variant consists in offsetting the first and second planes through an order of magnitude approximately equal to the chord of the lift elements, with the help of the intermediate links, thereby extending the applicability of the invention to a rotor possessing an arbitrary number of blades.

In addition, this third variant enables the aerodynamic characteristics of the rotor to be optimized by moving the lift elements away from the zone that is disturbed by the rotor head.

Furthermore, the rotor may optionally include stop means for limiting the flapping of each lift element.

This characteristic guarantees a degree of safety for the system by preventing the flapping of the lift elements being excessive, and consequently limiting the pitch of the blades.

The stop means are provided with a top plate that lies over a top portion of the rotor hub, at least in part, said top portion being situated on the side of the hub that is remote from the helicopter fuselage.

In a first version of the stop means, each lift element being mechanically linked to a blade successively via a hinge and a mechanical connection, the stop means include one stroke limiter per lift element. Each stroke limiter, e.g. an actuator, is then arranged between the top plate and the corresponding hinge so as to limit the flapping of the corresponding lift element.

The flapping of each lift element is then limited by the stroke of the associated stroke limiter.

In a second version of the stop means, the stop means are provided with a bottom plate that lies under a bottom portion of the rotor hub, at least in part, said bottom portion being situated on the side of the hub that faces the helicopter fuselage.

The flapping of the lift element, or of its pitch hinge with the mechanical connection linking it to a blade, is then limited by the bottom or top plates. In the event of excessive flapping, the lift element or its pitch hinge, as the case may be, comes into contact with the top or bottom plate which then stops its movement.

The top and bottom plates may optionally be provided locally with damper means to avoid degrading the lift element or its pitch hinge on coming into abutment.

Whatever the embodiment, the helicopter has one main rod per lift element so as to enable the pilot to adjust the pitch of each lift element. Each main rod is then hinged to an offset anchor point of a single lift element to control the pitch of the link element to which the main lift is hinged.

It will be understood that the anchor point is offset relative to the second longitudinal axis for varying the pitch of the lift element in order to control pivoting of said lift element.

In a first embodiment, the main rotor having a pitch control swashplate incorporating a rotary plate and a non-rotary plate, each main rod is hinged to the swashplate, and naturally also to the offset anchor point of the lift elements.

The pilot controls the swashplate, e.g. via servo-controls, to cause the pitch of the lift elements to vary, and consequently to vary the pitch of the blades.

For equivalent blades, the servo-controls of the invention are of dimensions and weight that are smaller in comparison with the servo-controls implemented in the third known device.

In a second embodiment, the main rotor has a pitch control swashplate incorporating a rotary plate and a non-rotary plate, and said main rod is hinged to a first branch of a crank, e.g. an L-shaped crank, secured to the hub of the rotor. A second branch of the crank is then connected to the rotary plate by a secondary link, said secondary link being hinged to the rotary plate.

It should be observed that the main rod is hinged either to the branch of the crank that is closer to the fuselage of the helicopter, or to the branch of the crank that is further from the fuselage.

Unlike the first embodiment, the rotary plate is not connected directly to the main rod of each lift element.

By implementing the second embodiment, it is found that when the lift element flaps upwards, its pitch tends to decrease if the anchor point of the lift element is arranged close to the leading edge of the lift element.

In contrast, its pitch increases if the anchor point of the lift element is arranged close to the trailing edge of the lift element, i.e. between the trailing edge and the second longitudinal axis for varying the pitch of the lift element.

This coupling between the pitch and the flapping of the lift element has a stabilizing effect on the response of the lift element, but reduces the efficiency of the system since it limits its response to a piloting instruction.

In a variant of the first embodiment, the anchor point of the main rod on the lift element may be offset towards the rear thereof, i.e. close to its trailing edge, so as to obtain pitch/flapping coupling that tends to increase flapping with increasing pitch. Such coupling tends to increase the efficiency of the device but at the risk of it becoming unstable if the coupling is excessive.

Unexpectedly, by implementing the second embodiment, the pitch of the lift element remains constant when flapping. In other words, this second embodiment serves to eliminate the pitch/flapping coupling of the lift element.

Thus, when using either the first embodiment or the second embodiment, it is possible to introduce into the device any value for the pitch/flapping coupling, and as a result to obtain best efficiency without instability.

In a third embodiment, the helicopter includes one actuator per main rod, e.g. an actuator of the piezoelectric type. Each main rod is then controlled by an actuator that is attached to the hub or to the mast of the rotor.

The actuator may be powered electrically via electrical slip rings arranged on a rotary mast of the rotor. Electricity is conveyed via electric cables from a generator installed in the fuselage of the helicopter, with the slip rings serving to transfer electricity from the stationary frame of reference of the fuselage to the rotary frame of reference of the rotor.

Nevertheless, it is advantageous to make an electricity generator using the rotary mast of the rotor.

In the usual way, the stator of the electricity generator is located inside the rotor mast, the stator being more rigidly secured to the end of the main transmission gearbox. The rotary member of the generator is then rigidly linked to the rotor mast.

Thus, rotation of the rotor mast enables the generator to generate the electricity needed to enable the actuators for the lift elements to operate properly.

The pilot's flight controls send an electrical signal to an actuator which then pushes or pulls a main rod so as to vary the pitch of the associated lift element. These controls can be transmitted via wireless transmission means using electromagnetic waves in that radio, infrared, or microwave frequency ranges.

The third embodiment therefore does not require a swash plate to be implemented.

The present invention also provides the method implemented by the claimed helicopter.

According to the invention, a method of varying the pitch of a helicopter rotor blade having at least two blades is remarkable in that said blade has a lift element that is linked solely thereto, and the lift generated by said lift element is adjusted so that the lift element flaps to cause the blade with which it is linked to turn about a first longitudinal axis for varying the pitch of said blade.

It should be observed that in the first and second prior art devices using two lift elements, the two lift elements act together on the hub of the rotor, thereby driving both blades together. In contrast, in the method of the invention, the lift is modified of a lift element that acts directly on a single blade.

Thus, the lift of the lift element is adjusted by modifying the pitch of said lift element and thus by causing the lift element to turn about a second longitudinal axis for varying the pitch of the lift element.

BRIEF DESCRIPTION OF THE DRAWINGS

The invention and its advantages appear in greater detail from the following description of embodiments given by way of illustration with reference to the accompanying figures, in which.

Elements present in more than one of the figures are given the same references in each of them.

MORE DETAILED DESCRIPTION

Figure 1:
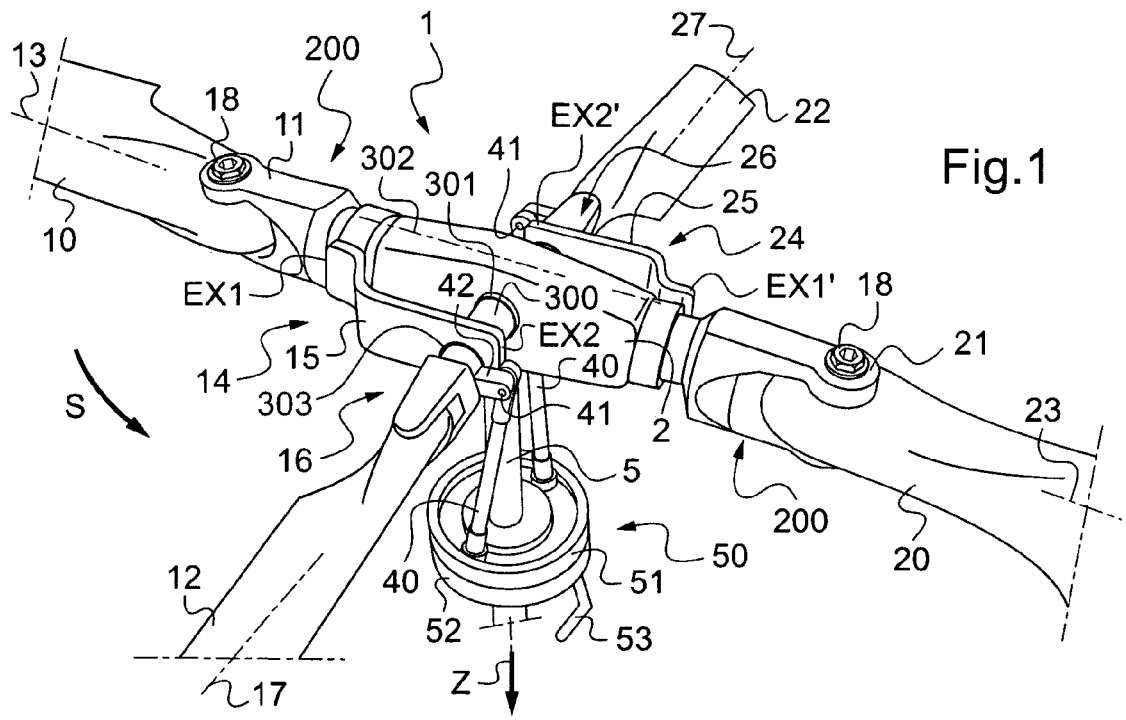
FIG. 1 is an isometric view of a first embodiment of the invention having lift elements supported by the hub.

FIG. 1 shows a helicopter rotor 1. The rotor 1 is fitted with first and second blades 10, 20 provided respectively with first and second attachment means 11, 21 for attaching them to the hub 2 of the rotor 1. The attachment means 11, 21 are attached to the hub 2 by the usual means (not shown) via laminated spherical stops for example, serving, amongst other things, to enable each blade 10, 20 to pivot about the corresponding first longitudinal axis 13, 23.

In the figures, the blades 10, 20 are secured to their attachment means 11, 21 by pins 18. Nevertheless, the attachment means may form integral portions of the blades without going beyond the ambit of the invention.

In addition, the rotor 1 includes one lift element 12, 22 per blade, each lift element being situated upstream from the associated blade relative to the direction of advance S of said associated blade. Thus, first and second lift elements 12, 22 are respectively mechanically linked to the first and second blades 10, 20 via first and second mechanical connections 14, 24. More precisely, the first and second lift elements 12, 22 are linked respectively to the attachment means 11, 21 in the attachment zone 200 of the first and second blades 10, 20.

Each mechanical connection 14, 24 is provided with a bent bar 15, 25 secured at its first end EX1, EX1' to a blade 10, 20, and secured at its second end EX2, EX2' to a hinge 16, 26 of the lift element 12, 22 associated with said blade 10, 20. Because of this hinge 16, 26, the lift element is suitable for performing rotary movement about the corresponding second longitudinal axis 17, 27 for varying pitch.

Thus, a first end EX1 of the first bar 15 is then secured to the first attachment means 11, for example by screws (not shown), while the second end EX2 of said bar 15 is secured to the lift element 12 to pivot about the flapping axis 302 of said lift element 12, being connected to a first hinge 16 of the first lift element 12. The first hinge 16 then allows the first lift element 12 to pivot about the corresponding second longitudinal axis 17 for pitch variation.

Similarly, a first end EX1' of the second bar 25 is secured to the second attachment means 21 while the second end EX2' of said second bar 25 is secured to the lift element 22 to pivot about the flapping axis of said lift element 22, being connected to a second hinge 26 of the second lift element 22. The second hinge 26 thus allows the second lift element 22 to pivot about the corresponding second longitudinal axis 27 for varying pitch.

Figure 10:
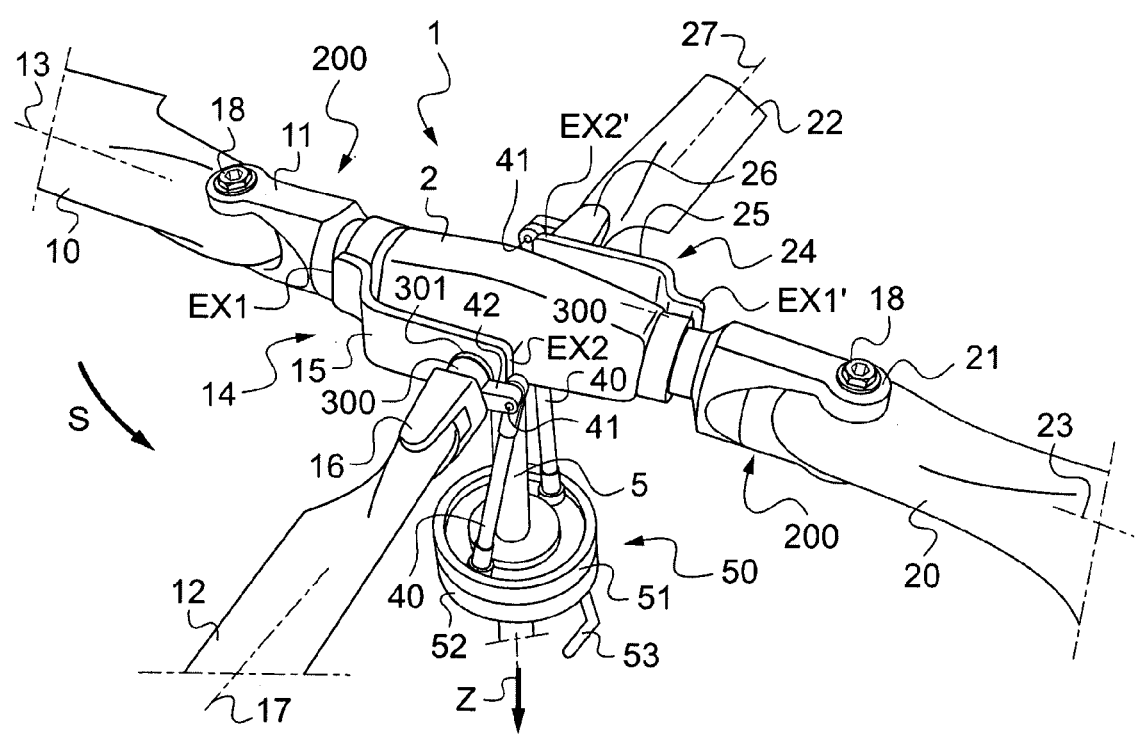
FIG. 10 is an isometric view of a first embodiment of the invention not having lift elements supported by the hub.

The first and second hinges 16 and 26 could thus be secured to the second ends EX2, EX2' of the first and second bars 15, 25, as shown in FIG. 10.

Nevertheless, with reference to FIG. 1, it is advantageous to support each lift element 12, 22.

The first hinge 16 of the first lift element 12 is then provided with support means 300 and an attachment 301 having three degrees of freedom, e.g. a spherical stop. The support means 300 passes through the first bar 15, via an orifice 303 formed in said second end EX2, prior to reaching the attachment 301 having three degrees of freedom that is secured to the hub 2.

The attachment 301 having three degrees of freedom is dimensioned so as to minimize the distance between the flapping axis 302 of the first lift element 12 and the first longitudinal axis 13 for varying the pitch of the corresponding first blade 10 so that said flapping axis 302 and said first longitudinal axis 13 substantially coincide.

It can be understood that all of the lift elements are advantageously provided with such hinges.

Consequently, a lift element is mechanically linked to a single blade.

The helicopter pilot then adjusts the lift generated by the lift elements 12, 22 in order to cause them to flap.

Each lift element is constrained to pivot with a first longitudinal axis 13, 23 for varying the pitch of the blade 10, 20 with which it is linked.

Consequently, when the first lift element 12 flaps, it turns about the first longitudinal axis 13 of the first blade 10. Since this lift element 12 is mechanically connected to the first attachment means 11 of the first blade 10, this first blade in turn performs a pivoting movement about the first longitudinal axis 13. This modifies the pitch of the first blade 10.

Similarly, when the second lift element 22 flaps, it beginning to turn about the first longitudinal axis 23 of the second blade 20 and thus entrains said second blade 20 so as to modify its pitch.

In addition, in order to adjust the lift of each lift element 12, 22, the pilot controls the pitch of these lift elements with the help of the usual controls (not shown in the figures) so as to cause the lift element 12, 22 to turn about the corresponding second longitudinal axis 17, 27 for varying pitch.

Consequently, the rotor 1 includes a main rod 40 for each lift element serving to control the pitch of said lift element.

Each main rod 40 is then hinged to an anchor point 41 that is offset from the lift element, more precisely a point that is offset from the support means 300 for the hinge 16. The anchor point 41 is said to be "offset" insofar as it does not lie on the second longitudinal axis 17.

In a first embodiment, the rotor 1 is equipped with a swashplate 50. The swashplate 50 possesses a non-rotary plate 52 linked to a non-rotary zone of the helicopter by a scissors linkage 53. Although the non-rotary plate 52 is not driven in rotation by the helicopter engine installation, it can nevertheless be inclined relative to the mast 5 of the rotor 1, by using a ball joint, via servo-controls that are not shown and that are activated by the pilot.

Furthermore, the swashplate 50 is fitted with a rotary plate 51 constrained to rotate with the mast 5. It should be observed that the swashplate 50 is of the usual type known to the person skilled in the art.

Under such conditions, the main rods 40 in this first embodiment are hinged firstly to the anchor point 41 of the associated lift element, and secondly to the rotary plate 51 that drives them in rotation.

It should be observed that the anchor point in this first embodiment is offset by an offset 42 that is substantially orthogonal to the direction Z along which the mast 5 extends.

Figure 2:
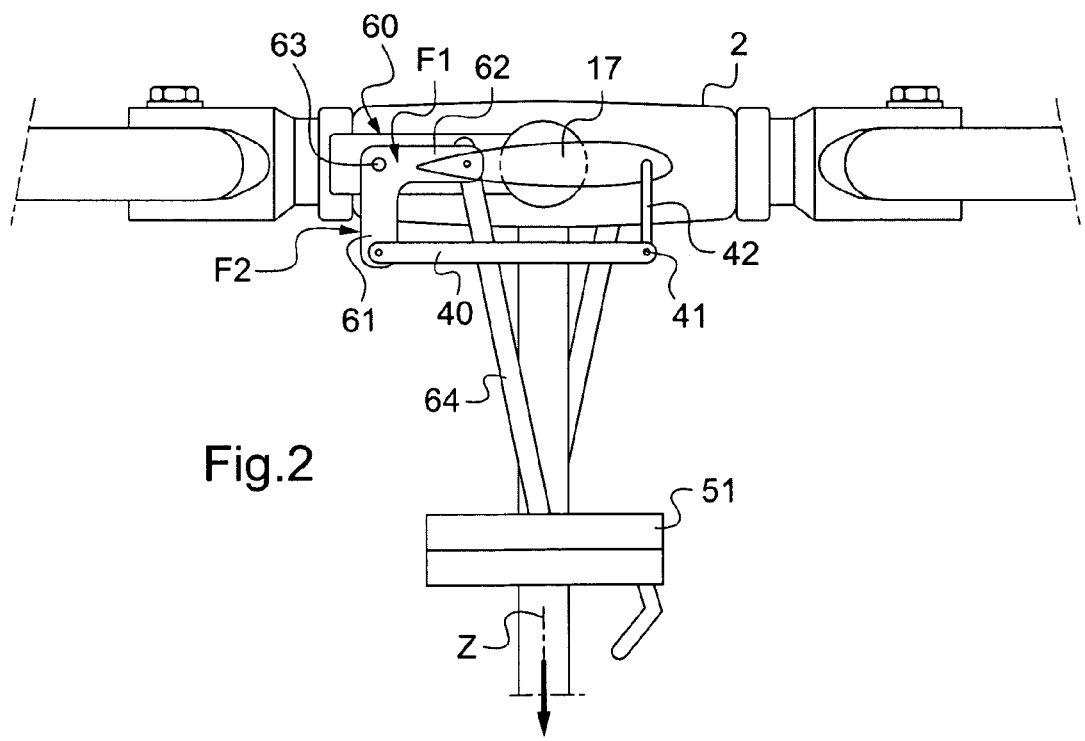
FIG. 2 is a side view of a first form of the second embodiment of the invention.

In the second embodiment shown in FIG. 2, which constitutes an improvement over the first embodiment, the rotor 1 further includes an L-shaped crank 60 for each lift element.

Each crank 60 has first and second branches 61, 62 that are mutually perpendicular, and is attached to the hub 2 of the rotor 1 by a rod 63 located at the junction between the first and second arms 61, 62. Each crank 60 is then free to pivot about its rod 63.

Each main rod 40 is hinged to the anchor point 41 of the associated lift element and to the first branch 61 of a crank 60. The main rod 40 is thus substantially horizontal in the frame of reference of the helicopter, and parallel to the second branch 62.

Unlike the first embodiment, the anchor point 41 is offset with the help of an offset 42 that is substantially parallel to the direction Z along which the mast 5 extends. The offset 42 is then substantially contained in a vertical plane that contains the second longitudinal axis 17 for varying the pitch of the link element 10.

Furthermore, the rotor 1 includes a secondary link 64 hinged firstly to the second branch 62 and secondly to the rotary plate 51. The secondary link is then substantially vertical in the frame of reference of the helicopter, and parallel to the first branch 61.

When the pilot operates the controls, the rotary plate 51 tilts and imparts its movement to the secondary link 64. This secondary link 64 exerts a force on the second branch 62 of the crank 60, which turns about its rod 63. The main rod 40 is then pushed or pulled as the case may be, thereby enabling the pitch of the lift element to be modified.

In the first form of the second embodiment, as shown in FIG. 2, the first branch 61 to which the main rod 40 is hinged represents the branch of the crank 60 that is the branch closer to the fuselage of the helicopter.

The main rod 40 is then attached to the outside face F2 of the crank extending towards the lift element, while the secondary link 64 is attached to the inside face F1 of the crank 60 facing the hub 2.

Consequently, the main and secondary links 40 and 64 do not risk colliding with each other.

Figure 3:
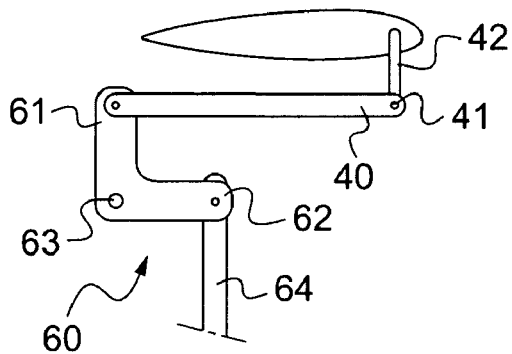
FIG. 3 is a side view of a second form of the second embodiment of the invention.

In the second form of the second embodiment, as shown in FIG. 3, the first branch 61 to which the main rod 40 is hinged constitutes the branch of the crank 60 that is the branch further away from the fuselage of the helicopter.

Consequently, the main and secondary links 40 and 64 do not risk crossing.

Figure 4:
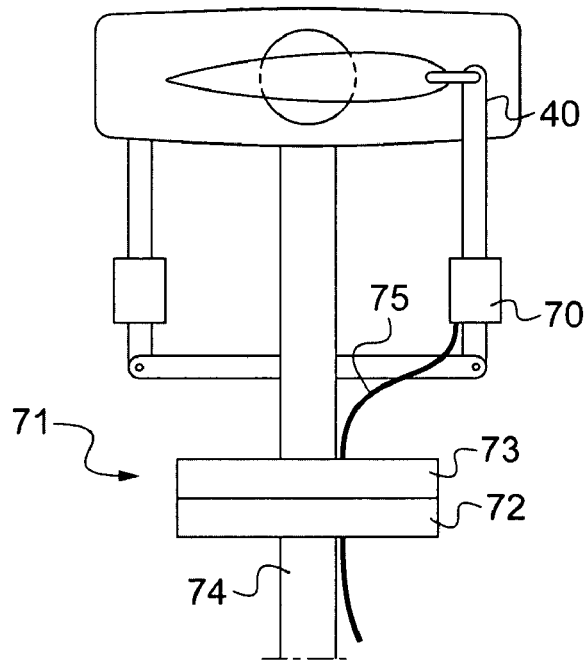
FIG. 4 is a diagrammatic side view of a third embodiment.

FIG. 4 shows a third embodiment of the invention. Each main rod 40 is secured to an actuator 70, possibly of the piezoelectric type, suitable for pulling it or pushing it. By way of example, each actuator 70 is attached to the mast 5 of the rotor via a flange provided for this purpose.

Furthermore, the helicopter includes electrical slip rings 71 of known type comprising a stator element 72 and a rotor element 73 carrying brushes or the equivalent, for passing electricity.

The rotor element 73 of the slip rings 71 is then connected by an electric cable 75 to the actuator 70, while the stator element 72 is connected by an electric cable 74 to an electrical power supply of the helicopter, and in particular optionally to piloting controls.

The pilot can thus cause the actuator to shorten or lengthen so as to vary the pitch of the associated lift element.

It should be specified that using a lift element to vary the pitch of a blade serves to limit control forces compared with devices known in the prior art.

It thus becomes possible to use a piezoelectric actuator for controlling the collective pitch and the cyclic pitch of the helicopter. This observation is surprising insofar as such actuators are normally not appropriate for such use because of the small amounts of movement they deliver.

Figure 5:
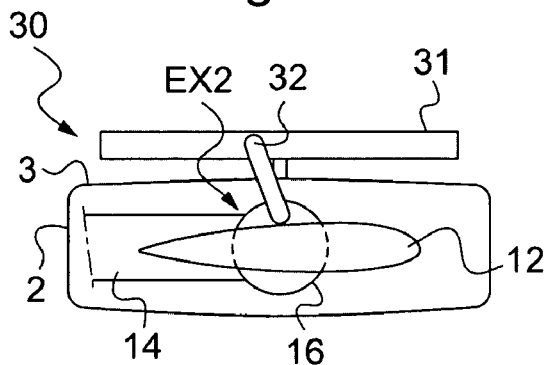
FIG. 5 is a side view of a first version of the stop means.
Figure 6:
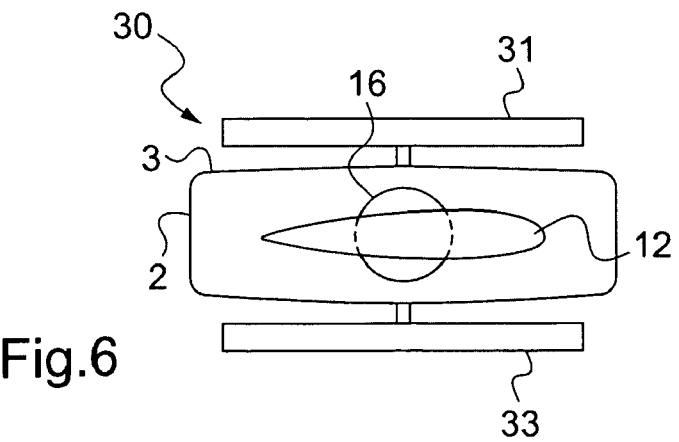
FIG. 6 is a side view of a second version of the stop means.

With reference to FIGS. 5 and 6, it can be seen that, whatever the embodiment, a helicopter is advantageously fitted with stop means 30 to limit the flapping of the lift elements.

These stop means 30 comprise a top plate 31 that lies over the hub 2 of the rotor 1 completely or in part. The top plate 31 thus faces the top portion 3 of the hub 2 that is furthest away from the fuselage of the helicopter.

In a first version of the stop means 30, shown diagrammatically in FIG. 5, the stop means 30 are also provided with a respective stroke limiter 32, e.g. an actuator, for each lift element.

Each stroke limiter 32 is then attached to the top plate 31 and to the second end EX2, EX2' of the corresponding bent bar 15, 25 of the associated lift element 12.

The predetermined stroke of the stroke limiter thus advantageously limits the flapping of the lift element 12.

In a second version shown in FIG. 6, the stop means 30 does not have a stroke limiter, but rather a bottom plate 33 lying under the bottom portion 4 of the hub 2, i.e. the portion closest to the helicopter fuselage.

The top and bottom plates 31 and 33 project from the hub 2. Thus, when the flapping of the blade exceeds a certain threshold, the second end EX2, EX2' of the corresponding bent bar 15, 25 of the lift element comes into contact with the top plate 31 or the bottom plate 33, thereby stopping its movement.

Damper elements, e.g. an elastomer stop, may be arranged on the top and bottom plates 31 and 33 so that the hinge is not damaged by the impact that results from coming into contact.

Figure 7:
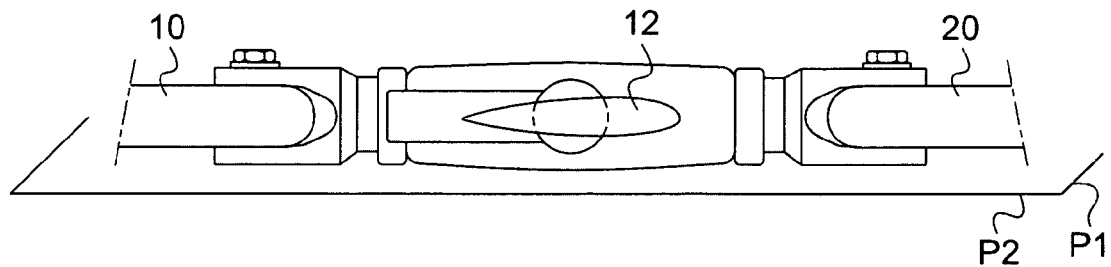
FIG. 7 is a side view of a first variant of the arrangement of the lift elements.
Figure 8:
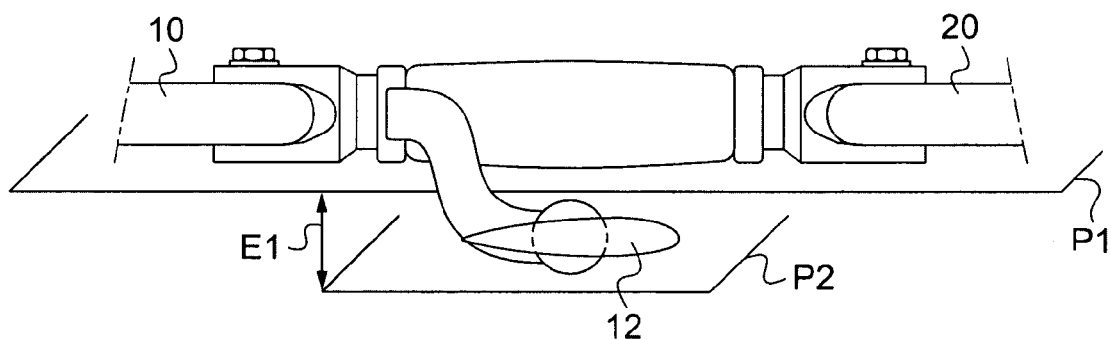
FIG. 8 is a side view of a second variant of the arrangement of the lift elements.

Furthermore, with reference to FIGS. 7 and 8, the blades 10, 20 are all contained in a first plane P1 when they are not flapping. The first plane P1 thus contains the first longitudinal axes 13, 23 for varying the pitch of the blades 10, 20.

Similarly, the lift elements are all contained in a single plane P2. Thus, the second plane P2 contains the second longitudinal axes 17, 27 for varying the pitch of the lift elements 12, 22.

In a first variant shown in FIG. 7, the first and second planes P1 and P2 coincide.

Nevertheless, in a second variant shown diagrammatically in FIG. 8, the first and second planes P1 and P2 are offset relative to each other, the first plane P1 being situated a little above the second plane P2.

The offset E1 existing between the first and second planes P1, P2 is of the same order as the thickness of the lift element.

Figure 9:
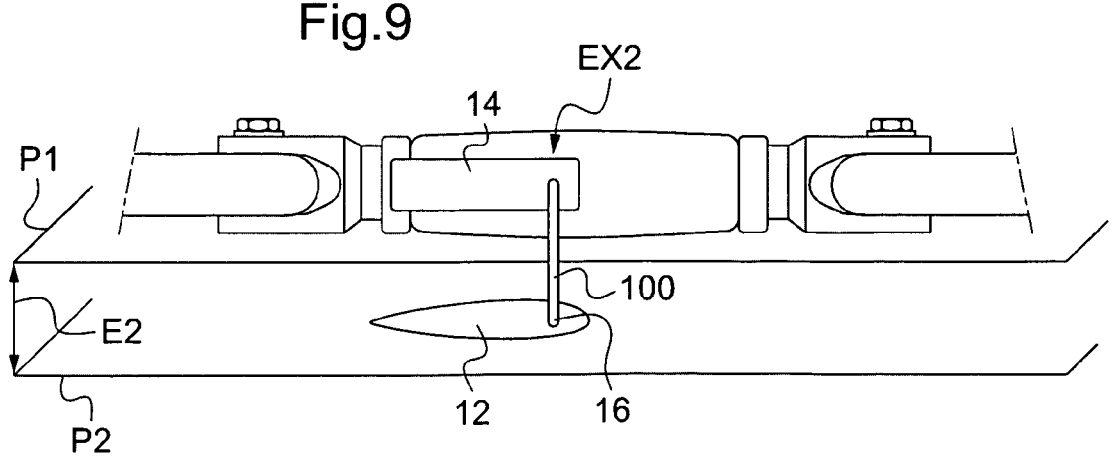
FIG. 9 is a side view of a third variant of the arrangement of the lift elements.

Finally, in the third variant shown in FIG. 9, the offset E2 between the first and second planes P1, P2 is large, being of the same order as the chord of the lift element.

Thus, an intermediate link 100 is arranged between the second end EX2 of each bent bar and the hinge 16 of the associated lift element 12.

It will be understood that the lift element 12 shown in FIGS. 8 and 9 is preferably supported by the hinge 16 of said lift element 12 by being also attached to the mast of the rotor, for example.

Naturally, the present invention can be subjected to numerous variations concerning its implementation. Although several embodiments are described, it will readily be understood that it is not conceivable to identify exhaustively all possible embodiments. It is naturally possible to envisage replacing any of the means described by equivalent means without going beyond the ambit of the present invention.

For example, the figures show a rotor having two blades and consequently having two lift elements. Nevertheless, the invention can be adapted without difficulty to a helicopter having a larger number of blades.

Furthermore, FIGS. 1 and 2 show that a bent bar mechanically linking a lift element to a corresponding blade is attached via its first end to the attachment means of said blade.

Nevertheless, said first end of the bent bar could be secured not to the attachment means but to the blade itself, to a root segment of the blade, for example, particularly since the attachment means may be incorporated in the blade.

More generally, the bent bar is attached to the zone 200 where the blade is attached to the rotor, as shown in FIG. 1.

What is claimed is:

1. A helicopter fitted with a main rotor having at least two blades, each blade being provided with attachment means to a hub of the rotor, wherein the helicopter is provided with one lift element per blade, each lift element being mechanically linked to a single blade to vary the pitch of said single blade.

2. A helicopter according to claim 1, wherein each lift element is constrained to turn with the blade with which it is mechanically linked about a first longitudinal axis for varying the pitch of said blade.

3. A helicopter according to claim 1, wherein each lift element is mechanically linked to a single blade via a mechanical connection that is independent of the hub of the rotor.

4. A helicopter according to claim 1, wherein the blades are contained in a first plane when they are not flapping, and the lift elements mechanically linked to said blades are contained in a second plane when they are not flapping, said first and second planes coinciding.

5. A helicopter according to claim 1, wherein the blades are contained in a first plane when they are not flapping, and the lift elements mechanically linked to said blades are contained in a second plane when they are not flapping, said first and second planes being mutually parallel.

6. A helicopter according to claim 1, wherein said rotor includes stop means for limiting the flapping of each lift element.

7. A helicopter according to claim 6, wherein said stop means is provided with a top plate lying over a top portion of the hub of the rotor, at least in part, said top portion being situated on the side of the hub that is remote from a fuselage of the helicopter.

8. A helicopter according to claim 7, wherein each lift element is mechanically linked to a blade successively via a hinge and a mechanical connection, said stop means including one stroke limiter per lift element, each stroke limiter being arranged between said top plate and each hinge to limit the flapping of each lift element.

9. A helicopter according to claim 7, wherein said stop means are provided with a bottom plate covering a bottom portion the hub of the rotor, at least in part, said bottom portion being situated on the side of the hub that faces the fuselage of the helicopter.

10. A helicopter according to claim 1, including one main rod per lift element, each main rod being hinged to an offset anchor point of a single lift element to control the pitch of said single lift element to which the main rod is hinged.

11. A helicopter according to claim 10, wherein said main rotor includes a pitch control swashplate fitted with a rotary plate and a non-rotary plate, and each main rod is hinged to said rotary plate.

12. A helicopter according to claim 10, wherein said main rotor includes a pitch control swashplate fitted with a rotary plate and a non-rotary plate, and said main rod is hinged to a first branch of crank secured to the hub of the rotor, a second branch of said crank being connected to the rotary plate by a secondary link.

13. A helicopter according to claim 12, wherein the helicopter includes one actuator per main rod, each main rod is controlled by an actuator that is electrically powered via electrical slip rings arranged on a rotary mast of the rotor.

14. A helicopter according to claim 13, wherein the helicopter includes one actuator per main rod, and each main rod is controlled by an actuator electrically powered via an electricity generator comprising a stator arranged inside the rotary mast of the rotor, and a rotor of the generator that is rigidly linked to the mast.

15. A helicopter according to claim 13, wherein said actuator is controlled by wireless transmission means.

16. A helicopter according to claim 1, wherein each lift element is managed in functionally and mechanically independent manner so as to vary the pitch of a single blade individually.

17. A helicopter fitted with a main rotor having at least two blades, each blade being provided with attachment means to a hub of the rotor, wherein the helicopter is provided with one lift element per blade, each lift element being mechanically linked to a single blade to vary the pitch of said single blade, wherein each lift element is mechanically linked to a single blade by a mechanical connection that comprises a bent bar having a first end secured to an attachment zone of the blade, said lift element being constrained to turn about the flapping axis of said lift element together with a second end of said bent bar via a hinge enabling the lift element to turn about a second longitudinal axis for varying the pitch of the lift element.

18. A helicopter according to claim 17, wherein said hinge of each lift element is then provided with support means and with an attachment having three degrees of freedom, said support means being secured to the corresponding lift element and said attachment having three degrees of freedom being attached to a rotary unit comprising the mast and the hub of said rotor and also to the attachment means attaching the blade to the hub of the rotor.

19. A helicopter according to claim 17, wherein said attachment zone incorporates the attachment means of the blade and a segment of said blade, said first end being secured to said attachment means.

20. A helicopter according to claim 17, wherein said attachment zone incorporates the attachment means of the blade and a segment of said blade, said first end being secured to said segment.

21. A helicopter fitted with a main rotor having at least two blades, each blade attached to a hub of the rotor, wherein the helicopter is provided with one lift element per blade, each lift element being mechanically linked to a single blade to vary the pitch of said single blade, wherein each lift element is mechanically linked to a single blade by a mechanical connection that comprises a bent bar having a first end secured to an attachment zone of the blade, a second end of each bent bar being attached by an intermediate link to the corresponding lift element enabling the lift element to perform pivoting movement about a second longitudinal axis for varying the pitch of the lift element.

* * * * *